United States Patent [19]

Edel et al.

[11] 4,326,689
[45] Apr. 27, 1982

[54] MOUNT FOR A HOUSING WHICH IS RELEASABLY FASTENED TO A WALL

[75] Inventors: Harry Edel; Wolfgang Lange, both of Berlin, Fed. Rep. of Germany

[73] Assignee: Robert Bosch GmbH, Stuttgart, Fed. Rep. of Germany

[21] Appl. No.: 114,672

[22] Filed: Jan. 23, 1980

[30] Foreign Application Priority Data

Feb. 24, 1979 [DE] Fed. Rep. of Germany ....... 2907322

[51] Int. Cl.³ .............................................. A47B 91/00
[52] U.S. Cl. .................................. 248/359; 248/221.4
[58] Field of Search ..................... 248/359, 545, 221.3, 248/221.4, 223.3, 311.2

[56] References Cited

U.S. PATENT DOCUMENTS 3,350,518 7/1967 Adler ................................ 248/221.4
3,574,964 4/1971 Ownbey ........................... 248/221.4
3,814,928 6/1974 Grosseau ........................ 248/221.4
3,950,904 4/1976 Littman ............................ 248/221.4

FOREIGN PATENT DOCUMENTS 489181 7/1938 United Kingdom ............. 248/221.3

OTHER PUBLICATIONS

Funkschau 1976, No. 9 p. 351.

Primary Examiner—Dave W. Arola
Attorney, Agent, or Firm—Spencer & Kaye

[57] ABSTRACT

In a mount assembly for releasably fastening a housing to a wall, including a wall mount member arranged to be fixed to the wall and a housing mount member fastened to a wall of the housing, the wall mount member is composed of a base fixable to the wall and presenting a tongue and a first elongate detent element so arranged that when the base is fixed to the wall, the tongue is located along the top of the base and extends horizontally and the detent element is oriented vertically and projects away from the wall, and the housing mount member includes a slot in the housing wall and a second elongate detent element so arranged and constructed that when the tongue engages the slot the second detent element can come into positive locking engagement with the first detent element.

5 Claims, 3 Drawing Figures

MOUNT FOR A HOUSING WHICH IS RELEASABLY FASTENED TO A WALL

BACKGROUND OF THE INVENTION

The present invention relates to a mount assembly for releasably fastening a housing to a wall, which assembly includes a wall mount member arranged to be fixed to the wall and a housing mount member fastened to a wall of the housing.

Microphone mounts are known, as disclosed for example in Funkschau, 1976, No. 9, page 351, which include a resilient clamp that is fastened to a wall in a motor vehicle, preferably the dashboard, into which a microphone housing, that may be cylindrical for example, can be snapped.

These and similar mounts, however, usually cannot withstand great vibratory stresses. Moreover, the insertion of the microphone into the mount presents difficulties, particularly if the vehicle is travelling at high speed.

SUMMARY OF THE INVENTION

It is an object of the present invention to provide a mount which presents a vibration resistant connection between the wall and the instrument housing and this in horizontal and vertical direction as well as at a right angle to the plane of fastening. A further object is to permit the housing to be attached to the wall by simple manipulation, particularly by hanging it in and then pressing it on.

These and other objects are achieved, according to the invention, by the division of a mount assembly of the type described above in which the wall mount member includes a base fixable to the wall and presenting a tongue and a first elongate detent element so arranged that when the base is fixed to the wall, the tongue is located along the top of the base and extends horizontally and the detent element is oriented vertically and projects away from the wall, and the housing mount member includes means defining a slot in the housing wall and a second elongate detent element so arranged and constructed that when the tongue engages the slot the second detent element can come into positive locking engagement with the first detent element.

According to the preferred embodiment of the invention, the first elongate detent element is formed of a strip-shaped portion having a bead edge member at its frontal edge and the second elongate detent element is formed by two strips whose free ends are resiliently movable toward one another and each of which is provided with a thickened portion at its free edge.

According to particular embodiments of the invention, the socket is provided with approximately L-shaped, resilient flanges at both sides and the flanges form with their flange arms a U-shaped guide pointing away from the wall and enclosing part of a correspondingly shaped rear wall of the housing.

Thus a guide is obtained for the housing to be fastened to the wall which, due to its resilient configuration, is effective also for housings having somewhat different dimensions.

DESCRIPTION OF THE PREFERRED EMBODIMENTS

Figure 1:
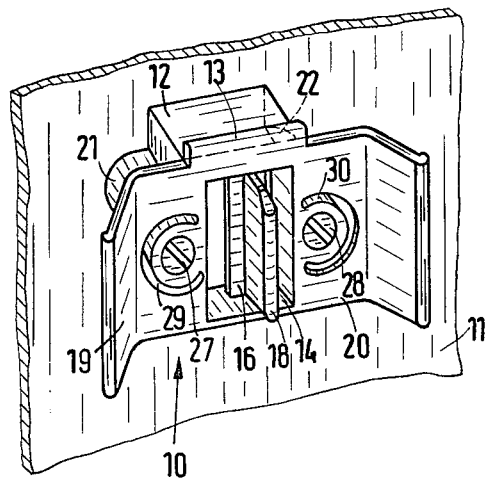
FIG. 1 is a perspective view of part of a mount according to a preferred embodiment of the invention fastened to a wall.
Figure 3:
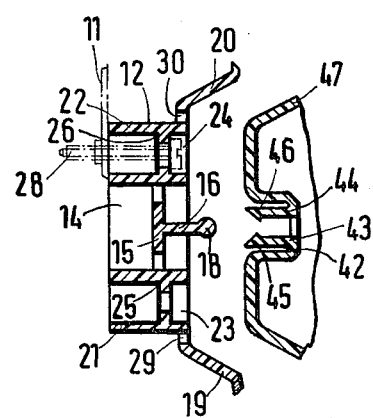
FIG. 3 is a cross-sectional view of the mount portions to be fastened together.

FIG. 1 shows the portion 10 of a mount according to the invention fastened to a vertical wall 11, for example the dashboard of an automobile. The mount has an essentially block-shaped base 12 with a strip-shaped tongue 13 disposed parallel to its upper frontal edge and to the wall 11. The base 12 is a hollow body, injection molded or stamped out of plastic, having a rectangular opening 14, as shown in FIG. 3. In the opening 14 there is a partition 15 extending parallel to the wall 11 and serving as the support for a vertically oriented elongate, strip-shaped detent element 16. The free end of the detent element has a rounded enlarged bead-like edge 18. The frontal face of the base 12, facing away from wall 11, extends into two approximately L-shaped flanges 19 and 20 which together form an approximately U-shaped guide.

In order to fasten the base 12 to the wall 11, the base is provided with two extensions 21 and 22 which may be cylindrical and which are provided with respective openings 23 and 24. Each opening is provided with an annular flange 25 or 26 through which passes the shaft of a respective screw 27 or 28 and which supports the head of its respective screw.

In order for the flanges 19 and 20 to be resilient, they are each provided with circularly arcuate cutout 29 or 30 around the extensions 22 or 23. Each cutout may be semicircular or larger.

Figure 2:
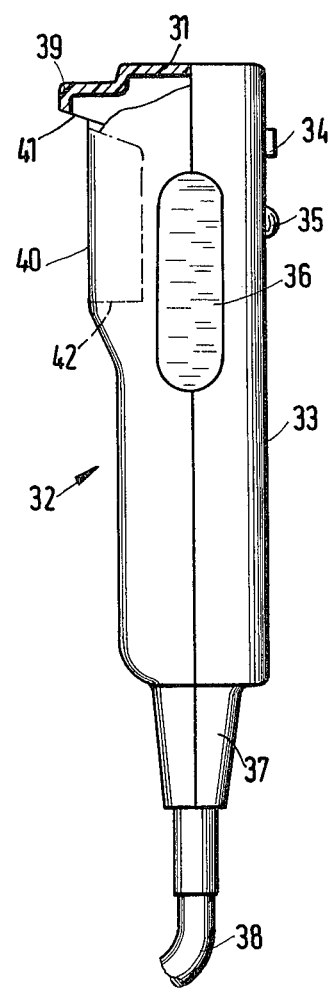
FIG. 2 is a side elevational view of a housing with mounting elements according to the invention fastened to the rear side of the housing.

As shown in FIG. 2, the essentially block-shaped housing 31 of a manual operating, hand-held member 32 for an automobile radio communication instrument is provided with operating elements, i.e. push buttons, 34 and display elements, i.e. lamps, 35 at its frontal face 33, with a transmitting key 36 at one side wall and a cable input 37 for connecting cable 38 at its lower end.

A protrusion 39 at the upper end of the rear wall 40 of the housing 31 forms an elongate slot 41 with which the housing can be hung onto the tongue 13 of the mount 10. In the rear wall 40 of the housing there is further provided an elongate recess 42 (see FIGS. 2 and 3) which extends parallel to the longitudinal axis of symmetry of the housing and from whose bottom project the free ends of two mutually resilient strips 43 and 44 which are parallel to one another and spaced apart a slight distance. The free ends of the strips are each provided with a thickened portion 45 or 46 which has a triangular or semicircular cross section.

In the area of the recess 42, the side walls 47 of housing 31 are made to diverge so as to enclose approximately the same angle as the resilient flanges 19, 20 of the mount 10, as best seen in FIG. 3.

The following will explain the operation of the above-described mount.

If the manual operating member 32 is to be fastened to the wall 11, it is first moved in the direction toward the mount 10 with the resilient flanges 19, 20 serving as guides.

This makes it relatively easy to hang the housing 31 with its slot 41 onto the tongue 13 of the mount 10. By exerting pressure onto the lower end of the frontal face 33 of the manual operating member, the detent connection is established between the detent element 16 of the mount 10 and the detent element formed by the two strips 43 and 44 of the manual operating member. The thickened portions 45 and 46 of the resilient strips 43 and 44 then snap over the beaded edge 18 of the detent element 16.

In this position, the manual operating member is fastened to the wall 11 in a manner which is secure against vibration. If the manual operating member is to be removed again, the lower end of the housing is lifted somewhat away from the wall 11 so that the detent connection between the detent element 16 and the two strips 43 and 44 is released; then the manual operating member can be lifted upwardly away from the tongue 13.

Moreover, the base 12 is advantageously designed in such a manner that it extends further from wall 11 at the bottom than at the top. Thus the manual operating member 32, when fastened to the mount, will be spaced somewhat farther away from the wall at its lower end and will take on an inclined position. In this way, the operator can easily grip the manual operating member in a position which is suitable for proper use of the manual operating member.

It is to be understood that the above description of the present invention is susceptible to various modifications, changes and adaptations, and the same are intended to be comprehended within the meaning and range of equivalents of the appended claims.

What is claimed is:

1. In a mount assembly for releasably fastening a housing to a wall, including a unitary wall mount member arranged to be fixed to the wall and a housing mount member fastened to a wall of the housing, the improvement wherein: said wall mount member comprises a base fixable to the wall and presenting a tongue, said base including a top and a front wall, said base presenting a first elongate detent element so arranged that when said base is fixed to the wall, said tongue is located along the top of said base and presents a horizontally oriented surface and said detent element presents horizontally spaced, vertically oriented surfaces and projects away from said front wall; and said housing mount member comprises means defining a slot in the housing wall and a second elongate detent element so arranged and constructed that when said housing mount member is fastened to said wall mount member said slot engages said horizontally oriented surface of said tongue and said second detent element engages said vertically oriented surfaces of said first detent element and comes into positive locking engagement with said first detent element.

2. Mount as defined in claim 1 wherein said first elongate detent element comprises a strip-shaped portion having a bead edge member at its frontal edge and said second elongate detent element comprises two strips whose free ends are resiliently movable toward one another and each of which is provided with a thickened portion at its free edge.

3. Mount as defined in claim 1 or 2 wherein said base comprises an approximately L-shape resilient flange at either side thereof, said flanges together forming a U-shaped guide whose arms are oriented away from the wall and enclose part of a correspondingly shaped wall of the housing.

4. Mount as defined in claim 1 wherein said means defining a slot is composed of a projection at the rear wall of the housing.

5. Mount as defined in claim 1 or 2 wherein said housing mount member comprises means defining an elongate recess in the housing wall, in which said second detent element is disposed.

* * * * *